US012186970B2

(12) United States Patent
Zheng et al.

(10) Patent No.: US 12,186,970 B2
(45) Date of Patent: Jan. 7, 2025

(54) MULTI-ARM FORMING DEVICE FOR SPACE ON-ORBIT COMPOSITE BRAIDING

(71) Applicant: NANJING UNIVERSITY OF AERONAUTICS AND ASTRONAUTICS, Nanjing (CN)

(72) Inventors: Jinghua Zheng, Nanjing (CN); Yiwei Chen, Nanjing (CN); Congze Fan, Nanjing (CN); Wenzhe Song, Nanjing (CN); Yaxing Song, Nanjing (CN); Zhongde Shan, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/776,250

(22) Filed: Jul. 18, 2024

(65) Prior Publication Data

US 2024/0367366 A1   Nov. 7, 2024

Related U.S. Application Data

(63) Continuation of application No. PCT/CN2024/079233, filed on Feb. 29, 2024.

(30) Foreign Application Priority Data

Mar. 3, 2023   (CN) .......................... 202310195115.X

(51) Int. Cl.
*B29C 53/80*   (2006.01)
*B29C 33/00*   (2006.01)
*B29C 53/56*   (2006.01)

(52) U.S. Cl.
CPC ...... *B29C 53/8016* (2013.01); *B29C 33/0083* (2013.01); *B29C 53/56* (2013.01)

(58) Field of Classification Search
CPC .. B29C 53/8016; B29C 33/0083; B29C 53/56
See application file for complete search history.

(56) References Cited

U.S. PATENT DOCUMENTS 4,387,868 A   6/1983 Regipa

FOREIGN PATENT DOCUMENTS

CN   202716406 U   *   2/2013
CN   108422418 A       8/2018
(Continued)

*Primary Examiner* — S. Behrooz Ghorishi
(74) *Attorney, Agent, or Firm* — Bayramoglu Law Offices LLC

(57) ABSTRACT

A multi-arm forming device for space on-orbit composite braiding is provided. Through the rotary movement of a combination of circularly arranged mechanical arm-type laying apparatuses relative to a mold, a plurality of hot press laying heads are controlled together to implement high-efficiency and high-freedom winding and braiding formation of a composite member. The retraction and expansion deformation of the gasbag mold is achieved by inflating and deflating based on design, and the overall device is lightened by switching its structural volume in an operating/non-operating state, thereby achieving the purpose of facilitating the lift-off of rockets and the demolding, repair and weight reduction of winding and braiding structural members for operation in space. Additionally, gas in a gasbag can be used as emergency kinetic energy for the movement and attitude adjustment of the overall device in space. High-quality and efficient winding and braiding formation of composites in space are achieved ultimately.

4 Claims, 3 Drawing Sheets

(56) References Cited

FOREIGN PATENT DOCUMENTS

| CN | 116494560 A | 7/2023 |
|---|---|---|
| WO | 9626887 A1 | 9/1996 |

* cited by examiner

MULTI-ARM FORMING DEVICE FOR SPACE ON-ORBIT COMPOSITE BRAIDING

CROSS REFERENCE TO THE RELATED APPLICATIONS

This application is the continuation application of International Application No. PCT/CN2024/079233, filed on Feb. 29, 2024, which is based upon and claims priority to Chinese Patent Application No. 202310195115.X, filed on Mar. 3, 2023, the entire contents of which are incorporated herein by reference.

TECHNICAL FIELD

The present invention belongs to the technical field of high-end device manufacturing, and particularly relates to a multi-arm forming device for space on-orbit composite braiding.

BACKGROUND

Thermoplastic resins and composites thereof have developed rapidly in the recent decade. Compared with thermoset materials, the thermoplastic resins have excellent impact toughness, fatigue damage resistance, and a series of advantages such as short molding cycle, high production efficiency, long-term storage, reparability and recyclability, and have been widely developed and applied in aerospace and other fields. With the emergence of novel aromatic thermoplastic resin matrix composites with good rigidity, heat resistance and media resistance, thermoplastic composites have overcome the previous disadvantages of low modulus of elasticity, poor solvent resistance, low strength of fiber-resin bonding and the like, and can be used as structural materials with high performance requirements. Additionally, the thermoplastic composites are prone to "in-situ" molding to omit the link of "post-curing" as required for the thermoset composites, thereby further improving the production efficiency of products. The so-called "in-situ" molding means that the lay-up of wires (or strips) on a mandrel and the shaping (curing for thermoset composites) can be completed simultaneously in the winding process.

To solve the problem of supply tension of space stations and break through the limitations of space and weight of launch vehicles, space on-orbit manufacturing has become a hot research direction at home and abroad. Current winding and braiding devices rely on molds, and fixed solid molds greatly affect the space and weight utilization of the launch vehicles. Therefore, a multi-arm forming device for space on-orbit composite braiding is developed from the perspective of light weight and replaceability.

SUMMARY

To solve the above problems, the present invention discloses a multi-arm forming device for space on-orbit composite braiding, with the aim of designing light molds, while switching overall structural dimensions based on changes in the working state of the device to break through the limitations of space and weight of a launch vehicle, and ultimately to achieve space on-orbit winding, braiding and forming of relevant structural members.

To achieve the above purposes, the present invention provides the following technical solutions:

A multi-arm forming device for space on-orbit composite braiding comprises a shell, a ring rail is provided on an outer ring of the shell, a plurality of magnetic levitation motion stages uniformly arranged in a circumferential array are provided on the ring rail, a combination of the magnetic levitation motion stages is capable of controlled circumferential motion along the ring rail, and each of the magnetic levitation motion stages is mounted with a mechanical arm-type laying apparatus; a retractable multi-segment connection pipe is provided at a center of the shell and connected to a gasbag mold, the gasbag mold achieves deformation operations of inflation and deflation by means of a first compressed gas source inside the shell through a retractable filling pipe inside the retractable multi-segment connection pipe, and a second compressed gas source inside the shell is used for supplying gas to a spray pipe at a bottom of the shell, so as to adjust the motion attitude of the overall forming apparatus in space.

Further, a motion body of the mechanical arm-type laying apparatus is a six-axis mechanical arm; an execution end is a hot press laying head, including a storage silo and two hot press rollers; the storage silo stores a thermoplastic prepreg strip; the mechanical arm-type laying apparatuses move circumferentially based on the combination of the magnetic levitation motion stages along the ring rail, and perform winding and braiding operations on the gasbag mold in a fully filled state to form a winding and braiding structural member ultimately.

The mechanical arm-type laying apparatuses control braiding angle changes by synergy with the rotational degrees of freedom of their execution ends to enhance the performance of the winding and braiding structural member.

Further, the retractable multi-segment connection pipe comprises an upper pipe, a middle pipe and a lower pipe, wherein the retractable multi-segment connection pipe is controlled for retractable deformation under the drive of an electric control board through a data line, and the upper pipe is connected to the gasbag mold; when the multi-arm forming device for space on-orbit composite braiding provided by the present invention is in an operating state, the retractable multi-segment connection pipe undergoes extension deformation, and the gasbag mold is pushed out to a suitable position for inflating deformation to facilitate winding and braiding by the mechanical arm-type laying apparatuses; when the multi-arm forming device for space on-orbit composite braiding provided by the present invention is in a non-operating state, the retractable multi-segment connection pipe undergoes retraction deformation, and the gasbag mold releases gas to shrink its volume for pull-back placement.

The gasbag mold can be applied in the following specific beneficial scenarios:

(1) Demolding: After winding and braiding, the gasbag mold releases gas to shrink its volume, which facilitates demolding and put into application scenarios;

(2) Repair: The gasbag mold can be fed into a tank-type structural member and the gasbag expanses by inflation to hold the structural member for repairing by winding and braiding;

(3) Weight reduction: The gasbag mold can be replaced to adapt to different structural members, thereby greatly reducing the load of a flight vehicle compared to conventional solid molds.

Further, a controllable gas valve is provided at the connection of a first filling pipe segment of the first compressed gas source and a second filling pipe segment of the second compressed gas source, the first compressed gas source is mainly used for inflating and deflating the gasbag mold, and the second compressed gas source is mainly used for supplying gas to the spray pipe; in emergencies, the first compressed gas source can supply power to the spray pipe through the gas valve.

Beneficial effects of the present invention are as follows:
- Through the rotary movement of the combination of the circularly arranged mechanical arm-type laying apparatuses relative to the mold, the plurality of hot press laying heads are controlled together to implement high-efficiency and high-freedom winding and braiding of a composite member;
- The retraction and expansion deformation of the gasbag mold is achieved by inflating and deflating, which realizes lightweight design of the overall device, thereby achieving the purposes of facilitating the demolding, repair and weight reduction of winding and braiding structural members under the operation in space;
- The gas in the gasbag can be used as emergency kinetic energy for the movement and attitude adjustment of the overall device in space.

DETAILED DESCRIPTION OF THE EMBODIMENTS

Figure 1:
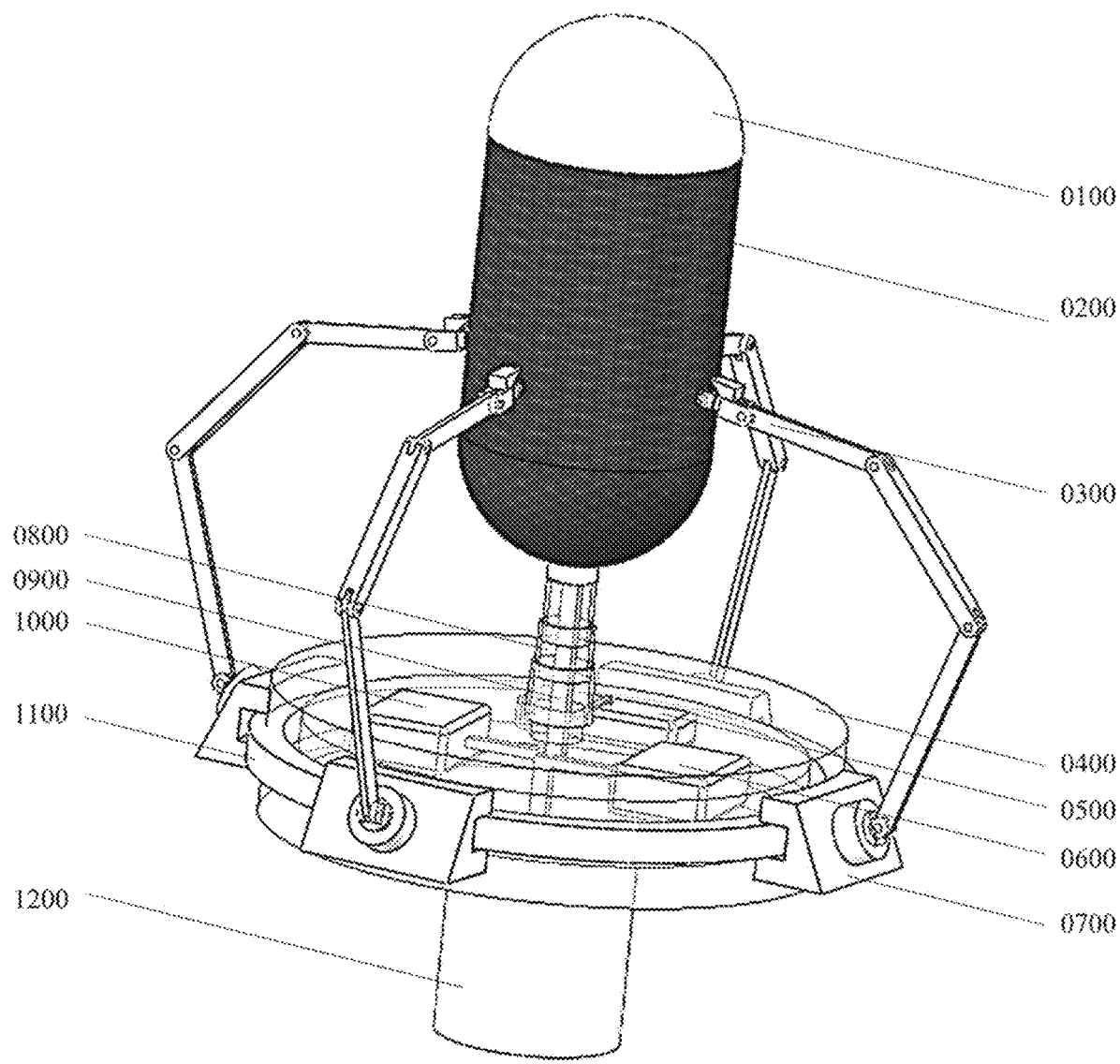
FIG. 1 is a schematic diagram of an overall structure of a device in the present invention (a gasbag mold is in a fully filled state).

The present invention is further illustrated below in conjunction with the accompanying drawings and specific embodiments. It should be understood that the following specific embodiments are merely used to illustrate the present invention and not to limit the scope of the present invention. It should be noted that the terms "front", "rear", "left", "right", "upper", and "lower" used in the following description refer to directions in the drawings, and the words "inner" and "outer" respectively refer to directions toward or away from geometric centers of particular components.

As shown in FIG. 1, this embodiment provides a multi-arm forming device for space on-orbit composite braiding. A ring rail 1100 is provided on an outer ring of a shell 0400 of the device, a plurality of magnetic levitation motion stages 0700 uniformly arranged in a circumferential array are provided on the ring rail 1100, a combination of the magnetic levitation motion stages 0700 is capable of controlled circumferential motion along the ring rail 1100, and each of the magnetic levitation motion stages 0700 is mounted with a mechanical arm-type laying apparatus 0300; a retractable multi-segment connection pipe 0800 is provided at a center of the shell 0400 and connected to a gasbag mold 0100; and the gasbag mold 0100 achieves deformation operations of inflation and deflation by means of a first compressed gas source 1000 inside the shell 0400 through a retractable filling pipe 0900 inside the retractable multi-segment connection pipe 0800.

A second compressed gas source 0600 inside the shell 0400 is used for supplying gas to a spray pipe 1200 at a bottom of the shell 0400, so as to adjust the motion attitude of the overall forming device in space.

A controllable gas valve 1300 is provided at the connection of a first filling pipe segment 0901 on the first compressed gas source 1000 and a second filling pipe segment 0902 on the second compressed gas source 0600. The first compressed gas source 1000 is mainly used for inflating and deflating the gasbag mold 0100, and the second compressed gas source 0600 is mainly used for supplying gas to the spray pipe 1200. In emergencies, the first compressed gas source 1000 can supply power to the spray pipe 1200 through the gas valve 1300.

Figure 2:
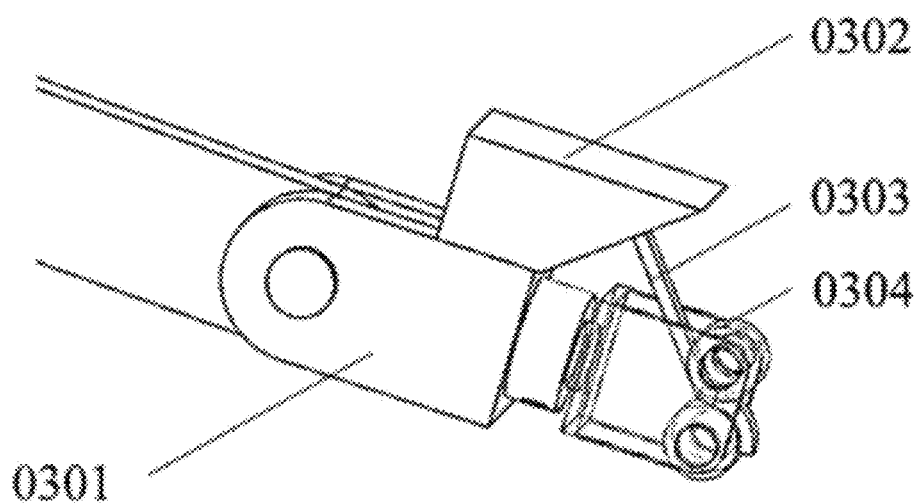
FIG. 2 is a partial schematic diagram of an execution end of a mechanical arm-type laying apparatus in the present invention.

As shown in FIG. 2, a motion body of the mechanical arm-type laying apparatus 0300 is a six-axis mechanical arm 0301; an execution end is a hot press laying head, including a storage silo 0302 and two hot press rollers 0304; the storage silo stores a thermoplastic prepreg strip 0303; the mechanical arm-type laying apparatuses 0300 move circumferentially based on the combination of the magnetic levitation motion stages 0700 along the ring rail 1100, and perform winding and braiding operations on the gasbag mold 0100 in a fully filled state to form a winding and braiding structural member 0200 ultimately.

The mechanical arm-type laying apparatuses control braiding angle changes by synergy with the rotational degrees of freedom of their execution ends to enhance the performance of the winding and braiding structural member. Meanwhile, a pressure sensor can be added to the execution end to better fit the gasbag mold 0100 for the winding operation.

Figure 3:
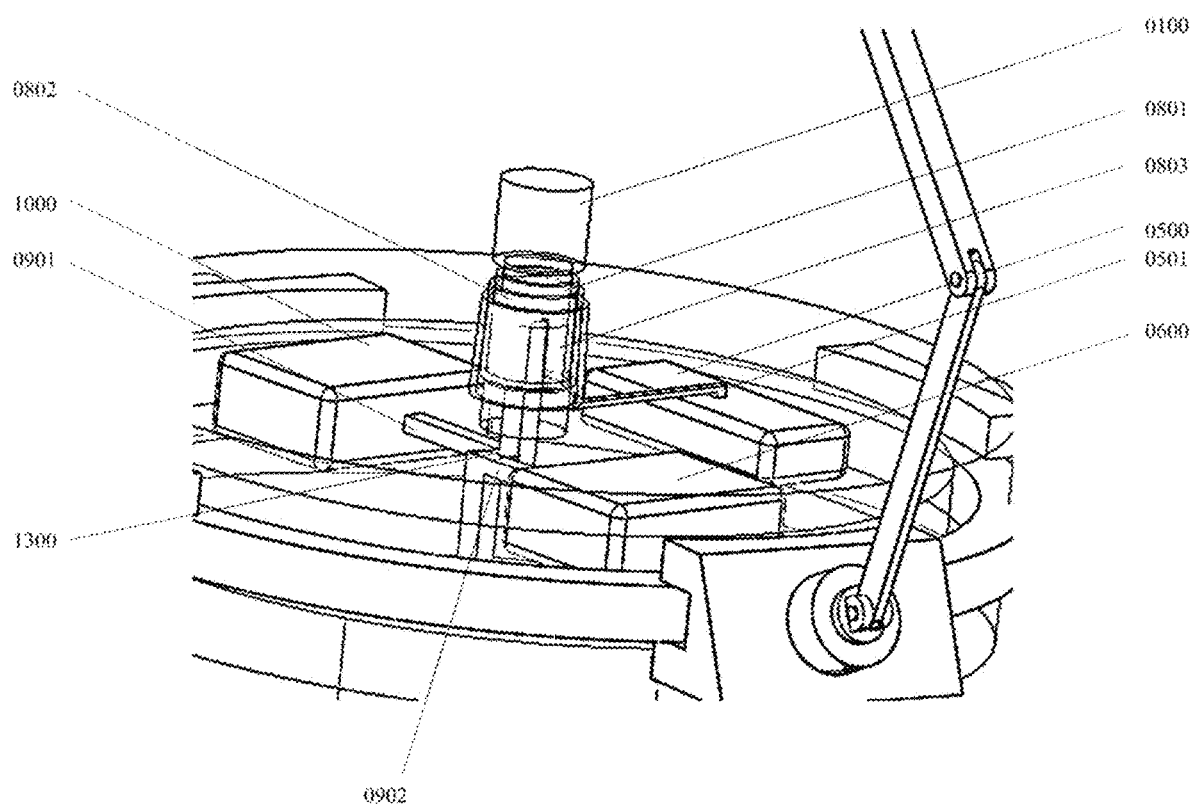
FIG. 3 is a partial schematic diagram of a retractable multi-segment connection pipe (the gasbag mold is in a contracted state).

As shown in FIG. 3, the retractable multi-segment connection pipe 0800 comprises an upper pipe 0801, a middle pipe 0802 and a lower pipe 0803, wherein the retractable multi-segment connection pipe 0800 is controlled for retractable deformation under the drive of an electric control board 0500 through a data line 0501, and the upper pipe 0801 is connected to the gasbag mold 0100; when the multi-arm forming device for space on-orbit composite braiding provided by the present invention is in an operating state, the retractable multi-segment connection pipe 0800 undergoes extension deformation, and the gasbag mold 0100 is pushed out to a suitable position for inflating deformation to facilitate winding and braiding by the mechanical arm-type laying apparatuses 0300. When the multi-arm forming device for space on-orbit composite braiding provided by the present invention is in a non-operating state, the retractable multi-segment connection pipe 0800 undergoes retraction deformation, and the gasbag mold 0100 releases gas to shrink its volume for pull-back placement.

The technical means disclosed by the technical solutions of the present invention are not limited to these disclosed in the above implementations and further include the technical solutions formed by any combination of the above technical features.

What is claimed is:

1. A multi-arm forming device for space on-orbit composite braiding, comprising a shell, wherein a ring rail is provided on an outer ring of the shell, a plurality of magnetic levitation motion stages uniformly arranged in a circumferential array are provided on the ring rail, a combination of the plurality of magnetic levitation motion stages moves circumferentially along the ring rail, and the plurality of magnetic levitation motion stages are mounted with mechanical arm laying apparatuses, respectively; a retractable multi-segment connection pipe is provided at a center of the shell, and a gasbag mold is connected to an end of the retractable multi-segment connection pipe, wherein the gasbag mold achieves deformation operations of inflation and deflation through a first compressed gas source, and the first compressed gas source and a second compressed gas source are both arranged inside the shell; the first compressed gas source is connected to a retractable filling pipe through a first filling pipe segment, and the retractable filling pipe is arranged inside the retractable multi-segment connection pipe; the second compressed gas source is used for supplying gas to a spray pipe at a bottom of the shell.

2. The multi-arm forming device for space on-orbit composite braiding according to claim 1, wherein a motion body of each of the mechanical arm laying apparatuses is a six-axis mechanical arm; an execution end is a hot press laying head, comprising a storage silo and two hot press rollers; the storage silo stores a thermoplastic prepreg strip; the mechanical arm laying apparatuses move circumferentially based on the combination of the plurality of magnetic levitation motion stages along the ring rail, and perform synergetic winding and braiding operations on the gasbag mold in a fully filled state to form a winding and braiding structural member ultimately.

3. The multi-arm forming device for space on-orbit composite braiding according to claim 1, wherein the retractable multi-segment connection pipe comprises an upper pipe, a middle pipe and a lower pipe, wherein the retractable multi-segment connection pipe is controlled for retractable deformation under a drive of an electric control board through a data line, and the upper pipe is connected to the gasbag mold; in an operating state, the retractable multi-segment connection pipe undergoes extension deformation, and the gasbag mold is pushed out to a suitable position for inflating deformation to facilitate winding and braiding by the mechanical arm laying apparatuses; in a non-operating state, the retractable multi-segment connection pipe undergoes retraction deformation, and the gasbag mold releases gas to shrink a volume of the gasbag mold for pull-back placement.

4. The multi-arm forming device for space on-orbit composite braiding according to claim 1, wherein a controllable gas valve is provided at a connection of the first filling pipe segment on the first compressed gas source and a second filling pipe segment on the second compressed gas source, the first compressed gas source is used for inflating and deflating the gasbag mold, and the second compressed gas source is used for supplying gas to the spray pipe; in emergencies, the first compressed gas source is allowed to supply power to the spray pipe through the controllable gas valve.

* * * * *